(12) United States Patent
Ouyang et al.

(10) Patent No.: US 12,487,505 B2
(45) Date of Patent: Dec. 2, 2025

(54) FLASH UNIT, CAMERA AND CAMERA FLASH SYSTEM

(71) Applicant: SHENZHEN MINGMEI MOBILE TECHNOLOGY CO., LTD., Shenzhen (CN)

(72) Inventors: Jun Ouyang, Shenzhen (CN); Yuanchao Mo, Shenzhen (CN); Yong Li, Shenzhen (CN)

(73) Assignee: SHENZHEN MINGMEI MOBILE TECHNOLOGY CO., LTD., Shenzhen (CN)

( * ) Notice: Subject to any disclaimer, the term of this patent is extended or adjusted under 35 U.S.C. 154(b) by 227 days.

(21) Appl. No.: 18/457,369

(22) Filed: Aug. 29, 2023

(65) Prior Publication Data

US 2025/0028226 A1 Jan. 23, 2025

(30) Foreign Application Priority Data

Jul. 22, 2023 (CN) .......................... 202310903447.9

(51) Int. Cl.
*G03B 17/08* (2021.01)
*F21K 5/06* (2006.01)
*G03B 11/04* (2021.01)
*G03B 17/12* (2021.01)

(52) U.S. Cl.
CPC ............. *G03B 17/08* (2013.01); *G03B 11/04* (2013.01); *G03B 15/0442* (2013.01); *G03B 17/12* (2013.01); *G03B 2215/0567* (2013.01)

(58) Field of Classification Search
CPC . G03B 2215/0542; G03B 15/05; G03B 17/08
See application file for complete search history.

(56) References Cited

U.S. PATENT DOCUMENTS

| 6,404,987 | B1 * | 6/2002 | Fukui | G03B 15/05 |
| | | | | 396/173 |
| 7,783,188 | B2 * | 8/2010 | Clark | G03B 15/05 |
| | | | | 348/371 |
| 11,383,807 | B2 * | 7/2022 | Jongsma | G06T 1/0007 |

(Continued)

FOREIGN PATENT DOCUMENTS

| CN | 113179128 A | * | 7/2021 | ............. H04B 13/02 |
| JP | 2001033852 A | * | 2/2001 | |

*Primary Examiner* — Leon W Rhodes, Jr.

(57) ABSTRACT

Disclosed are a flash unit, a camera and a camera flash system, and relates to the technical field of underwater photographic equipment, including a flash lamp, capable of illuminating an photographed object; a video lamp, having the functions of color temperature adjustment and full color gamut coverage by light; a camera body, taking photos for the illuminated object; a waterproof case; a flash trigger, capable of generating an optical signal; and a repeater, capable of receiving the optical signal from the flash trigger, and then encoding and transmitting a new high-power optical signal. According to the present disclosure, under the cooperation of components such as the flash trigger and the repeater, the optical signal can be transmitted wirelessly over long distance underwater, thus achieving the effect of using the flash and video lamps far away from the camera. The present disclosure has a broad market application prospect.

20 Claims, 12 Drawing Sheets

(56) References Cited

U.S. PATENT DOCUMENTS

2005/0174473 A1\* 8/2005 Morgan ............... H05B 45/355
348/370
2010/0254692 A1\* 10/2010 Kurt ....................... G03B 15/03
396/155

\* cited by examiner

//\# FLASH UNIT, CAMERA AND CAMERA FLASH SYSTEM

TECHNICAL FIELD

The present disclosure relates to the technical field of underwater photographic equipment, and more particularly relates to a flash unit, a camera and a camera flash system.

BACKGROUND

Underwater photography is a type of film and television special effect photography. A photographer carries a video camera or camera with a waterproof protection cover and diving equipment to dive into water for photography. The underwater photography can truly reflect underwater scenes, such as underwater animals and plants, seabed, riverbed and other geological data, and archaeological discoveries. The underwater photography has a wide range of applications in scientific research, military, sports, teaching, and other fields. With the development of science and technology, it gradually enters the public life.

The existing underwater camera usually adopts optical fiber to propagate flash signals of a flash trigger to control the flashing of a flash lamp. However, the optical fiber has the defects of large energy loss and inability to propagate over a long distance, which makes the flash lamp unable to be used away from the camera.

SUMMARY

In order to overcome the defects in the prior art, the present disclosure provides a flash unit, a camera and a camera flash system. Under the cooperation of components such as a flash trigger and a repeater, optical signals can be transmitted wirelessly over a long distance underwater, achieving the effect of using a flash lamp and a video lamp far away from the camera. The present disclosure has a high market application prospect.

For this purpose, the present disclosure adopts the following technical solution:

the present disclosure provides a flash unit, including:
a flash lamp, capable of illuminating a photographed object, and
a video lamp, having the functions of color temperature adjustment and full color gamut coverage by light.

In a preferred technical solution of the present disclosure, the flash lamp includes a first housing, an end cover, a first circuit board, a reflection cup, a flash lamp tube, a first fisheye receiving window and a first end light sensor; the first circuit board is arranged in the first housing, the top of the first housing is fixedly provided with the end cover, the top of the end cover is fixedly provided with the reflection cup, the flash lamp tube is fixedly installed inside the reflection cup, one side of the first housing is fixedly provided with the first fisheye receiving window, the first end light sensor is fixedly arranged in the first fisheye receiving window, and the terminal of the flash lamp tube and the terminal of the first end light sensor are both threaded into the first housing and electrically connected to the first circuit board.

In a preferred technical solution of the present disclosure, several flash lamp tubes are arranged, and the flash lamp tubes are arranged in a circular shape.

In a preferred technical solution of the present disclosure, the top center of the end cover is fixedly provided with a sighting lamp.

In a preferred technical solution of the present disclosure, the end cover is fixedly provided with a flash lamp cover, and the inner side of the flash lamp cover is fixedly provided with an arc-shaped glass shade.

In a preferred technical solution of the present disclosure, the bottom of the first housing is rotatably connected to an adjustment knob, one end of the adjustment knob extends into the first housing and is electrically connected to a battery contact, and the battery contact is electrically connected to the first circuit board.

In a preferred technical solution of the present disclosure, the adjustment knob includes a brightness knob and a function knob.

In a preferred technical solution of the present disclosure, the maximum receiving angle of the first end light sensor is 160°.

In a preferred technical solution of the present disclosure, the flash lamp and the video lamp are both fixedly provided with an end receiver, and the end receiver is an external flash trigger capable of receiving optical signals.

In a preferred technical solution of the present disclosure, the video lamp includes a second housing, a bracket, a second circuit board, a first battery, a color temperature changing LED lamp, a second fisheye receiving window and a second end light sensor, where the bracket and the first battery are fixedly arranged in the second housing, the side wall of the second housing is fixedly provide with the second fisheye receiving window, the second fisheye receiving window is provided with the second end light sensor, the second end light sensor is threaded into the second housing and is clamped to a groove on the bracket, the top of the second housing is fixedly provided with the color temperature changing LED lamp, and the terminal of the first battery, the terminal of the color temperature changing LED lamp and the terminal of the second end light sensor are all electrically connected to the second circuit board.

In a preferred technical solution of the present disclosure, the first battery includes a battery holder, a clamp block, a battery body and an on-off knob, a clamp slot is formed in one side of the battery holder, the clamp block is fixedly arranged on the inner side wall of the second housing, the clamp block is clamped to the clamp slot, the battery body is arranged in the battery holder, the on-off knob is rotatably connected to the bottom of the battery holder, and one end of the on-off knob abuts against the battery body.

In a preferred technical solution of the present disclosure, the bottom of the second housing is rotatably connected a color temperature knob, and the connecting end of the color temperature knob extends into the second housing and is electrically connected to the second circuit board.

In a preferred technical solution of the present disclosure, the maximum receiving angle of the second end light sensor is 160°.

The disclosure further discloses a camera, including:
the flash unit;
a waterproof case, the flash unit being detachably connected to the waterproof case;
a camera body installed inside the waterproof case, capable of taking photos for an illuminated object; and
a flash trigger installed on the inner top wall of the waterproof case, capable of generating an optical signal to control the operation of the flash unit, the flash trigger being electrically connected to a hot shoe on the top of the camera body,
a repeater being installed on the top of the waterproof case and capable of receiving the optical signal from the flash trigger, and then encoding and transmitting new high-power optical signals, and the top of the waterproof case being also provided with a waterproof light hole, and the flash trigger and the repeater being respectively arranged at both ends of the waterproof light hole.

In a preferred technical solution of the present disclosure, the repeater includes a third housing, a third circuit board, a middle section light sensor, a light input locking ring, a light input optical fiber, a fisheye transmitting window, an optical signal transmitter and a second battery, the third circuit board is arranged in the third housing, the third circuit board is fixedly provided with the middle section light sensor, the bottom of the third housing is fixedly provided with the light input locking ring, the light input locking ring is threadedly connected to the waterproof light hole, the light input locking ring is of a hollow structure, the light input optical fiber is arranged in the light input locking ring, both sides of the third housing are fixedly provided with the fisheye transmitting window, the optical signal transmitter is arranged in the fisheye transmitting window, the third housing is fixedly provided with the second battery, and the terminal of the middle section light sensor, the terminal of the light input optical fiber, the terminal of the optical signal transmitter and the terminal of the second battery are all electrically connected to the third circuit board.

In a preferred technical solution of the present disclosure, the third housing is fixedly provided with a fixing member, the fixing member includes a ball head fixing sheet, a ball head and a fastening bolt, the ball head fixing sheet is fixedly arranged on the third housing, a fastening threaded hole is formed in the ball head fixing sheet, and the ball head is fixedly connected to the ball head fixing sheet through the fastening bolt.

In a preferred technical solution of the present disclosure, the third circuit board is fixedly provided with an encoder, and the encoder is electrically connected to the third circuit board.

In a preferred technical solution of the present disclosure, the maximum transmitting angle of the optical signal transmitter is 160°.

The disclosure further discloses a camera flash system, including:

the camera.

The beneficial effects of the present disclosure are as follows:

1. According to the flash unit, the camera and the camera flash system of the present disclosure, under the cooperation of components such as the flash trigger and the repeater, the optical signal can be transmitted wirelessly over a long distance underwater, achieving the effect of using the flash lamp and the video lamp far away from the camera. The present disclosure has a broad market application prospect.
2. The encoder can quickly encrypt and encode the optical signal, so that the optical signal can be distinguished from natural light and light emitted by other external devices, so that a terminal receiving device can recognize it.
3. The optical signal transmitter can generate optical signals suitable for propagation underwater, and emit them at a large angle around the third housing, which are then received by the flash lamp and the video lamp to achieve long-distance underwater transmission.

1. flash lamp; 101. first housing; 102. end cover; 103. first circuit board; 104. reflection cup; 105. flash lamp tube; 106. first fisheye receiving window; 107. first end light sensor; 108. sighting lamp; 109. flash lamp cover; 110. arc-shaped glass shade; 111. adjustment knob; 112. battery contact; 113. brightness knob; 114. function knob; 2. video lamp; 21. second housing; 22. bracket; 23. first battery; 231. battery holder; 232. clamp slot; 233. clamp block; 234. battery body; 235. on-off knob; 24. color temperature changing LED lamp; 25. second fisheye receiving window; 26. second end light sensor; 27. color temperature knob; 3. end receiver; 4. waterproof case; 41. waterproof light hole; 5. camera body; 6. flash trigger; 7. repeater; 71. third housing; 72. third circuit board; 73. light input locking ring; 74. light input optical fiber; 75. fisheye transmitting window; 76. optical signal transmitter; 77. second battery; 78. fixing member; 781. ball head fixing sheet; 782. fastening threaded hole; 783. ball head; and 784. fastening bolt.

DETAILED DESCRIPTION

The following is a further explanation of the technical solution of the present disclosure in combination with the accompanying drawings and specific implementations.

Figure 1:
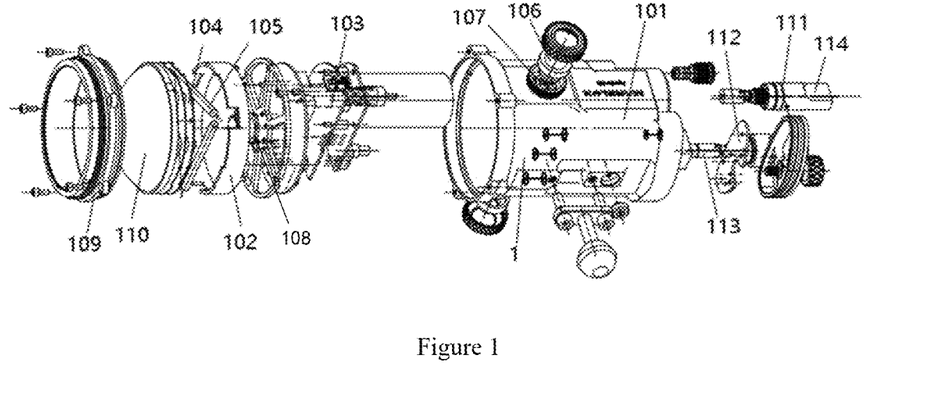
FIG. 1 is an exploded view of a flash lamp in this embodiment.
Figure 2:
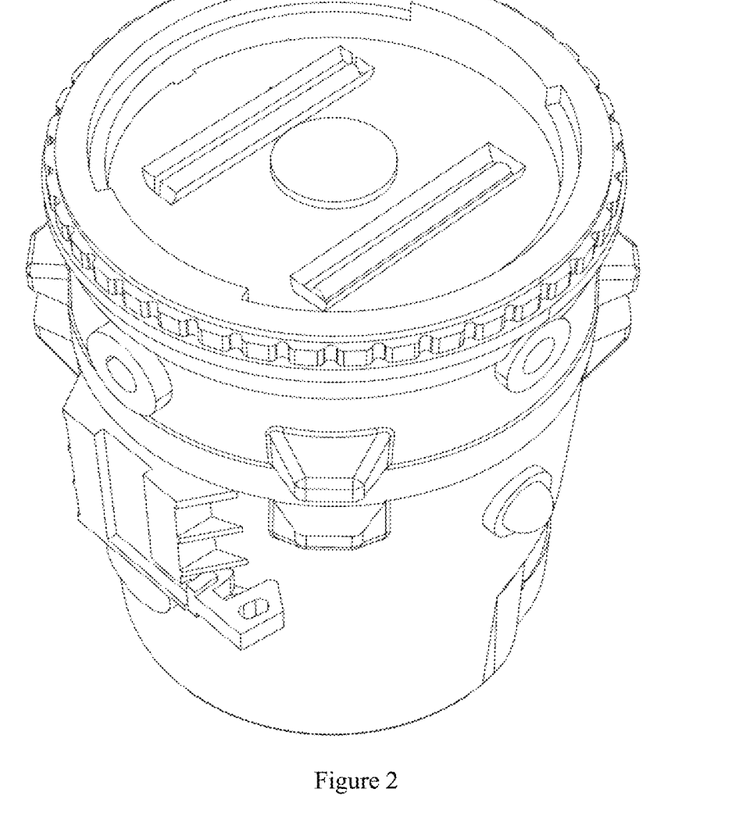
FIG. 2 is a schematic structural diagram of a flash lamp with two flash lamp tubes in this embodiment.
Figure 3:
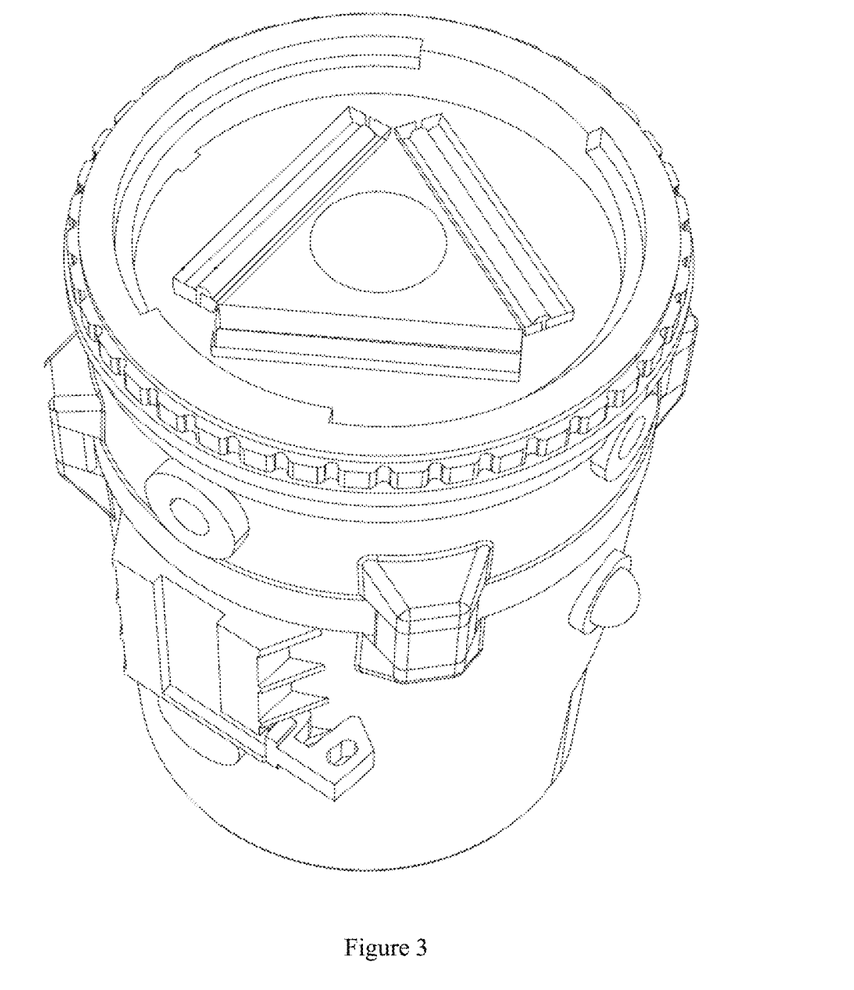
FIG. 3 is a schematic structural diagram of a flash lamp with three flash lamp tubes in this embodiment.
Figure 4:
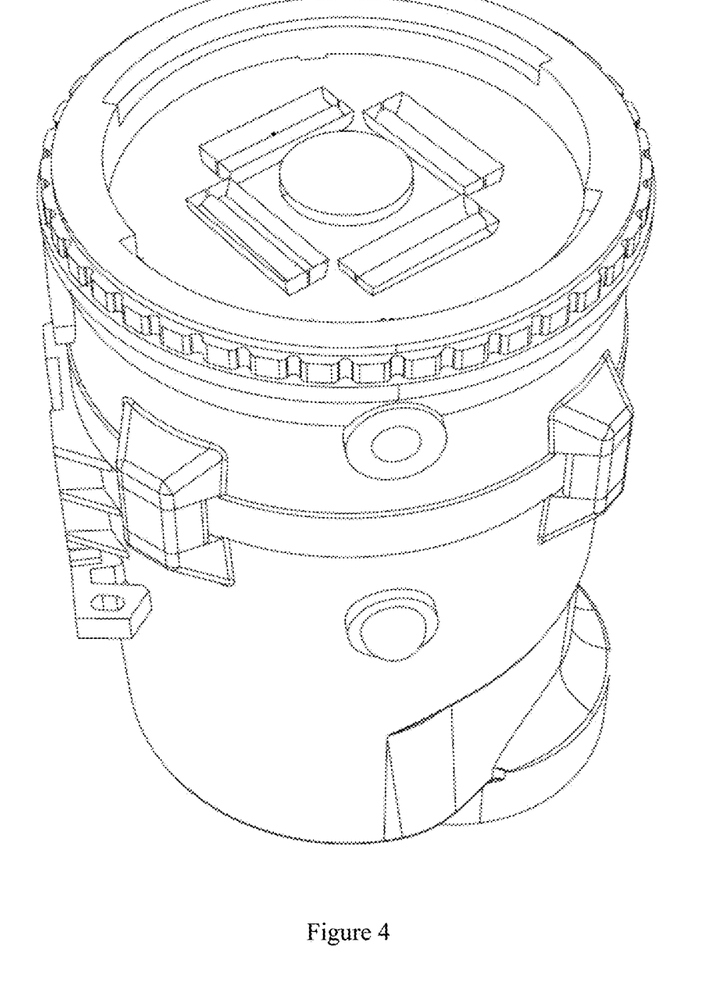
FIG. 4 is a schematic structural diagram of a flash lamp with four flash lamp tubes in this embodiment.
Figure 5:
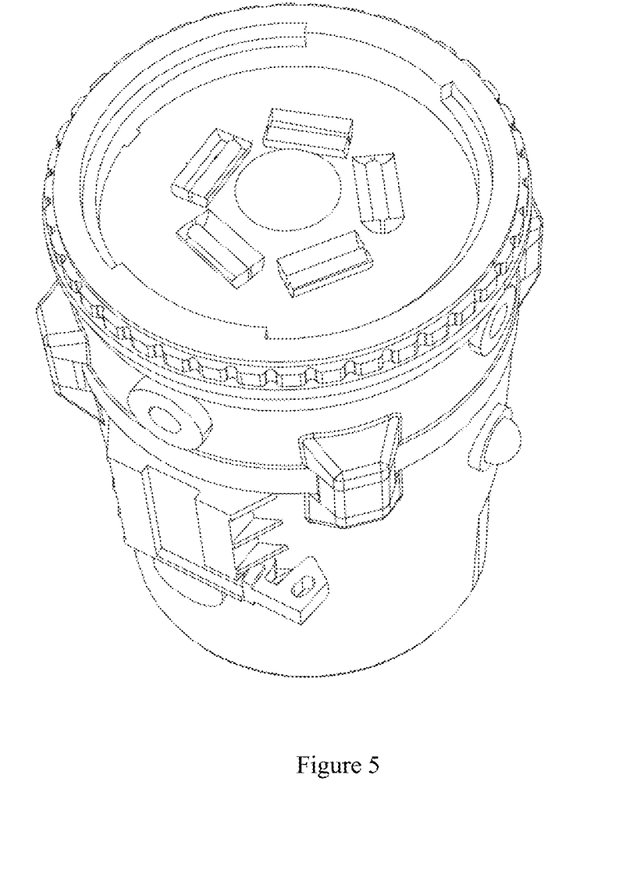
FIG. 5 is a schematic structural diagram of a flash lamp with five flash lamp tubes in this embodiment.
Figure 6:
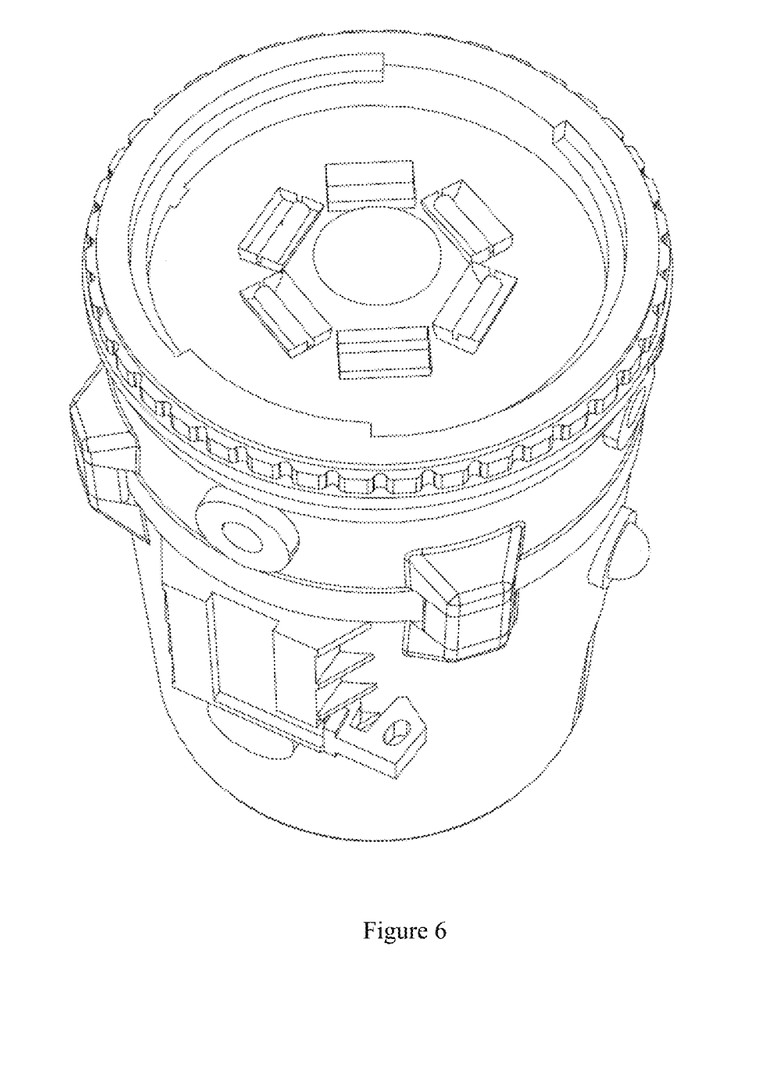
FIG. 6 is a schematic structural diagram of a flash lamp with six flash lamp tubes in this embodiment.
Figure 9:
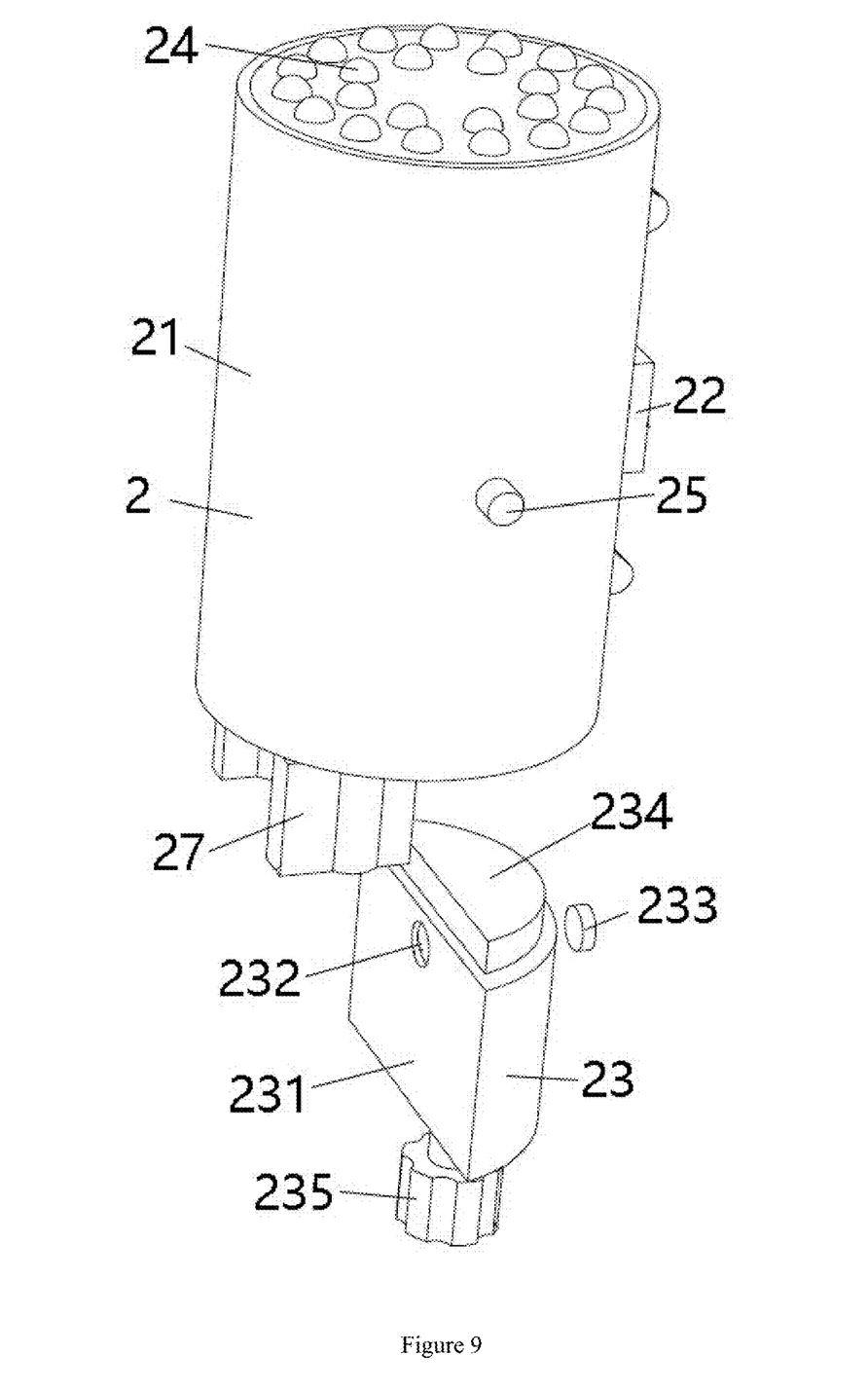
FIG. 9 is an exploded view of a video lamp in this embodiment.

As shown in FIG. 1 to FIG. 12, an embodiment provides a flash unit, including:

a flash lamp 1, capable of illuminating a photographed object to meet the requirements of taking photos underwater, and a video lamp 2, having the functions of color temperature adjustment and full color gamut coverage by light to meet the needs of underwater photography.

Specifically, the flash lamp 1 includes a first housing 101, an end cover 102, a first circuit board 103, a reflection cup 104, a flash lamp tube 105, a first fisheye receiving window 106 and a first end light sensor 107. The first circuit board 103 is arranged in the first housing 101. The top of the first housing 101 is fixedly provided with the end cover 102. The top of the end cover 102 is fixedly provided with the reflection cup 104. The flash lamp tube 105 is fixedly installed inside the reflection cup 104. One side of the first housing 101 is fixedly provided with the first fisheye receiving window 106. The first end light sensor 107 is fixedly arranged in the first fisheye receiving window 106. The terminal of the flash lamp tube 105 and the terminal of the first end light sensor 107 are both threaded into the first housing 101 and electrically connected to the first circuit board 103. In this embodiment, the first housing 101 may be a cylinder or a rectangular cylinder. The top end face of the end cover 102 is provided with a groove for accommodating the reflection cup 104 and an opening for the terminal to pass through. The reflection cup 104 is fixedly connected to the end cover 102 through fasteners, which are screws. There are clamping ports at both ends of the reflection cup 104 for clamping the terminal of the flash lamp tube 105. The terminal of the flash lamp tube 105 can pass through the opening in the end cover 102, and a sealing ring is arranged inside the opening to prevent water from entering the first housing 101. The first fisheye receiving window 106 is made of a transparent glass material to allow an optical signal to pass through, so that the optical signal can be recognized by the first end light sensor 107. The first end light sensor 107 is capable of receiving the optical signal and quickly decoding them into an electrical signal to drive the flash lamp tube 105 to flash, thereby realizing wireless remote control over the flash lamp 1 underwater, or freely adjusting the flash lamp 1. It can avoid the situations where optical fibers or cables tend to get entangled or tripped on underwater plants, increasing the risk of underwater photography. The bottom of the end cover 102 is provided with a heat dissipation sheet for cooling the apparatus.

Figure 7:
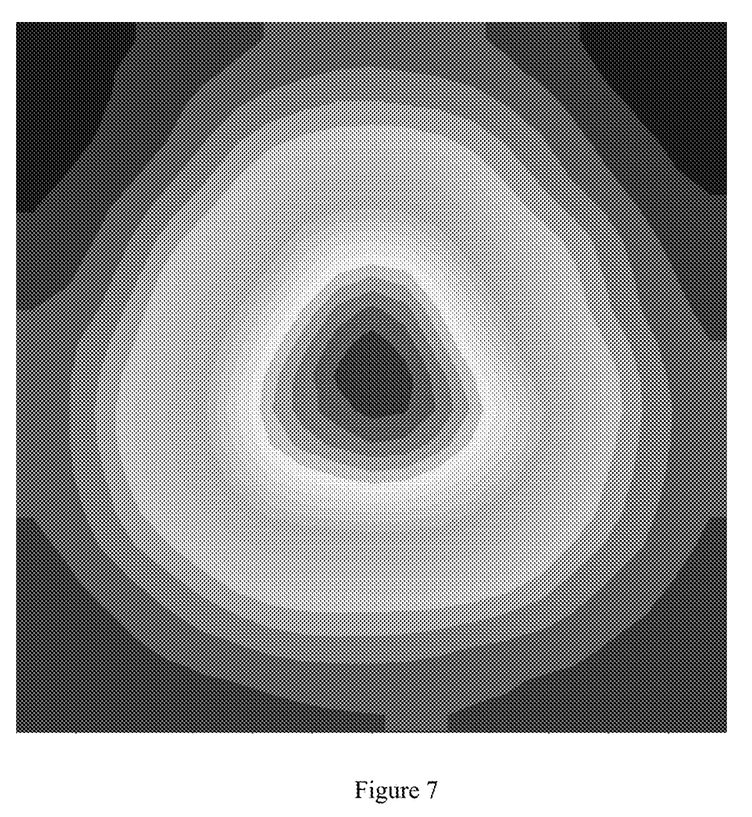
FIG. 7 is a diagram of illuminating effect of the flash lamp with three flash lamp tubes in this embodiment.

Specifically, several flash lamp tubes 105 are arranged, and the flash lamp tubes 105 are arranged in a circular shape. In this embodiment, there may be two, three, four, five and six flash lamp tube 105, and its specific installation method is shown in FIGS. 2-6. Different numbers of circumferentially distributed flash lamp tubes 105 can produce different brightness. As the number of circumferentially distributed flash lamp tubes 105 increases, the brightness increases accordingly. In addition, the flash lamp tubes 105 are arranged in a circular shape, which makes the illuminating light of the flash lamp 1 distributed equally, thereby contributing to improving the quality of photos. A diagram of illuminating effect of the flash lamp with three tubes is shown in FIG. 7.

Specifically, the top center of the end cover 102 is fixedly provided with a sighting lamp 108. In this embodiment, with the sighting lamp 108, it is convenient for divers to aim at the photographed object, and the sighting lamp 108 is of a detachable structure, which may be installed or not.

Specifically, the end cover 102 is also fixedly provided with a flash lamp cover 109, and the inner side of the flash lamp cover 109 is fixedly provided with an arc-shaped glass shade 110. In this embodiment, the arc-shaped glass shade 110 is made of a transparent material, and a sealing ring is arranged in the connecting gap between the arc-shaped glass shade 110 and the end cover 102, which can prevent water from damaging the flash lamp tube 105.

Specifically, the bottom of the first housing 101 is rotatably connected to an adjustment knob 111. One end of the adjustment knob 111 extends into the first housing 101 and is electrically connected to a battery contact 112, and the battery contact 112 is electrically connected to the first circuit board 103. In this embodiment, the adjustment knob 111 is arranged on the outer side of the first housing 101 for manually controlling the operation of the flash lamp 1 or freely adjusting the flash lamp 1.

Specifically, the adjustment knob 111 includes a brightness knob 113 and a function knob 114. In this embodiment, the brightness knob 113 is used for adjusting the brightness of the flash lamp tube 105, and the function knob 114 is used for controlling the operation of the flash lamp 1.

Specifically, the maximum receiving angle of the first end light sensor 107 is 160°.

Figure 8:
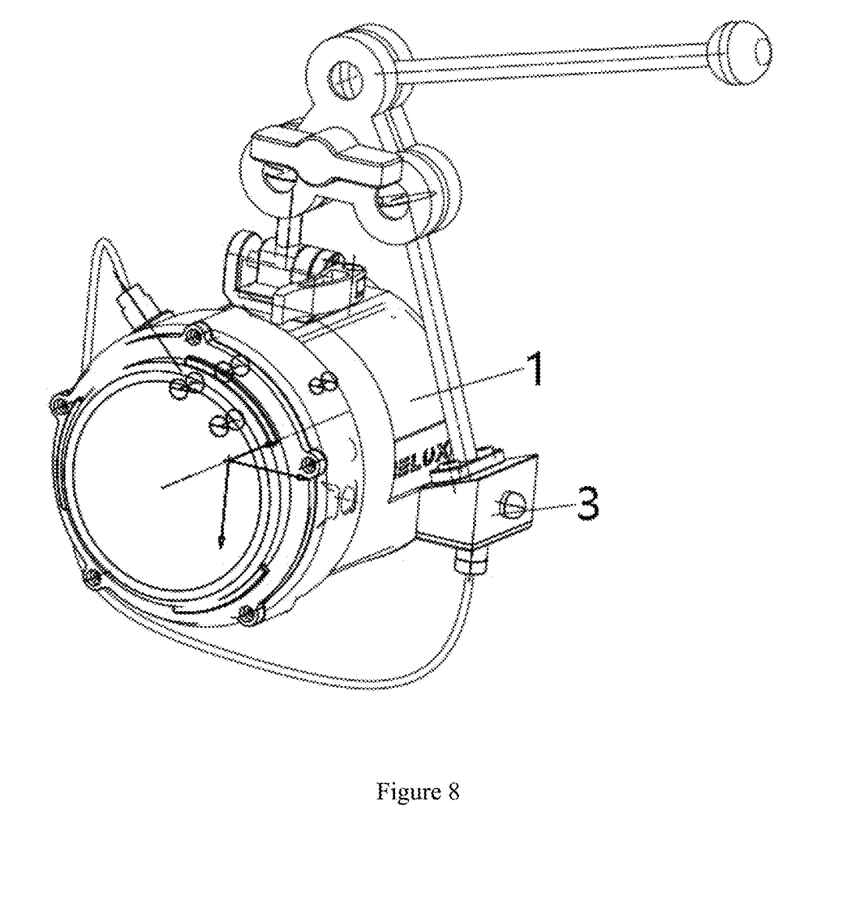
FIG. 8 is schematic diagram of an installation structure of an end receiver and a flash lamp without a built-in light sensor in this embodiment.

Specifically, the flash lamp 1 and the video lamp 2 are both fixedly provided with an end receiver 3, and the end receiver 3 is an external flash trigger capable of receiving an optical signal. In this embodiment, for a flash lamp without a built-in light receiving sensor and processing circuit, it is an option to install the end receiver 3 outside the flash lamp. The end receiver 3 is provided with one or more optical signal receiving sensors and a decoding circuit. After receiving and decoding the optical signal, the optical signal is converted into a strong optical signal required by ordinary flash lamp for flashing. Through the optical fiber, or direct irradiation of the flash lamp, or optical signal receiving ports on other terminal devices, the flashing of these devices is achieved.

Figure 10:
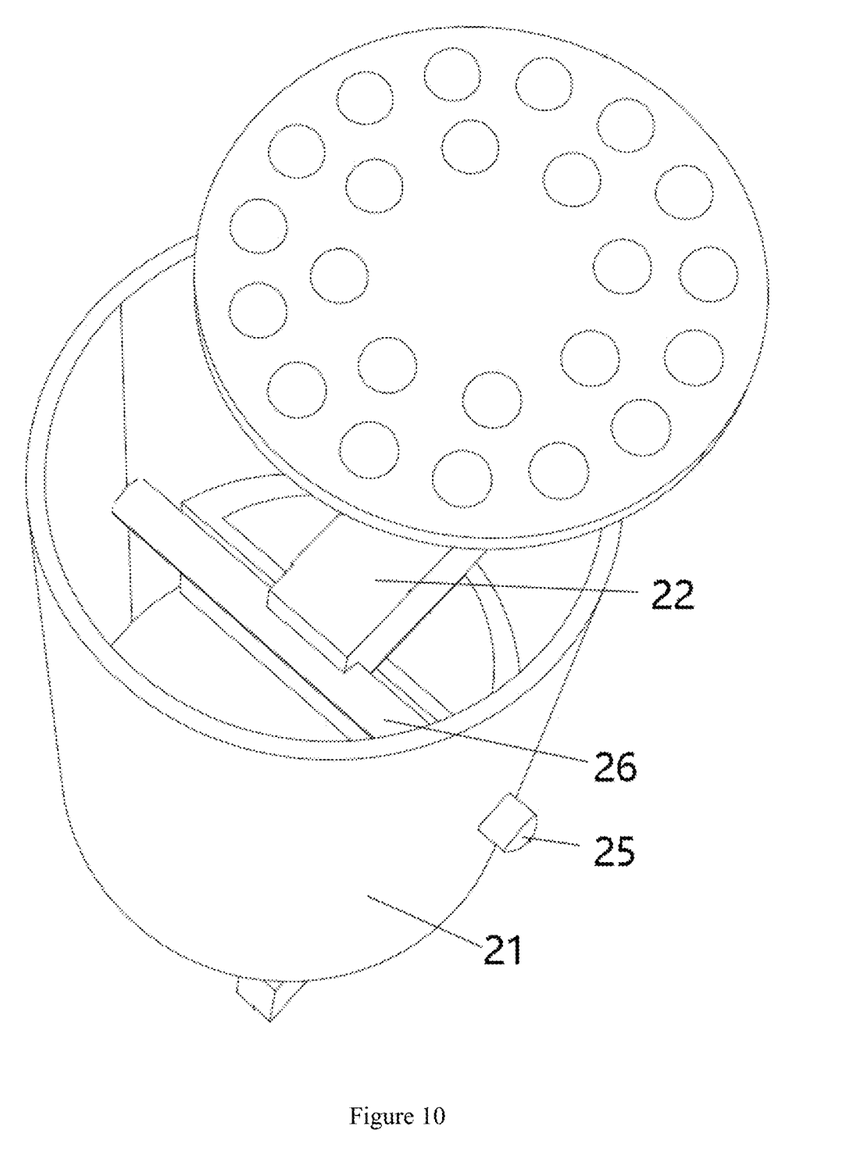
FIG. 10 is an internal structure diagram of a video lamp in this embodiment.

Specifically, the video lamp 2 includes a second housing 21, a bracket 22, a second circuit board, a first battery 23, a color temperature changing LED lamp 24, a second fisheye receiving window 25 and a second end light sensor 26. The bracket 22 and the first battery 23 are fixedly arranged in the second housing 21. The side wall of the second housing 21 is fixedly provided with the second fisheye receiving window 25. The second end light sensor 26 is arranged in the second fisheye receiving window 25, and the second end light sensor 26 is threaded into the second housing 21 and is clamped to a groove on the bracket 22. The top of the second housing 21 is fixedly provided with the color temperature changing LED lamp 24. The terminal of the first battery 23, the terminal of the color temperature changing LED lamp 24 and the terminal of the second end light sensor 26 are all electrically connected to the second circuit board. In this embodiment, the second housing 21 may be a cylinder or a rectangular cylinder. The bracket 22 and the second housing 21 may be integrally formed by injection molding, or the bracket 22 may be bonded to the inner side wall of the second housing 21. The end part of the bracket 22 is provided with a groove, and one end of the second end light sensor 26 is clamped to the groove, thereby making the second end light sensor 26 steady on the second housing 21. The second circuit board can process the signal received by the second end light sensor 26, thereby controlling the operation of the color temperature changing LED lamp 24. The second fisheye receiving window 25 is made of a transparent glass material to allow the optical signals to pass through, so that the optical signal can be recognized by the second end light sensor 26. The number of color temperature changing LED lamps 24 may be provided as needed, and several color temperature changing LED lamps 24 are arranged in a circular shape, which contributes to eliminating illumination shadows and evenly distributing the light on the photographed object.

Specifically, the first battery 23 includes a battery holder 231, a clamp block 233, a battery body 234 and an on-off knob 235. A clamp slot 232 is formed in one side of the battery holder 231. The clamp block 233 is fixedly arranged on the inner side wall of the second housing 21, and the clamp block 233 is clamped to the clamp slot 232. The battery body 234 is arranged in the battery holder 231. The on-off knob 235 is rotatably connected to the bottom of the battery holder 231. One end of the on-off knob 235 abuts against the battery body 234. In this embodiment, a conductive sheet is arranged on the second circuit board. The conductive sheet is located above the battery body 234. After the battery body 234 abuts against the conductive sheet, the battery body can provide power for the second circuit board. The bottom of the second housing 21 is provided with a semi-circular through hole for installing the battery holder 231, and the battery body 234 is slidably connected into the battery holder 231. By rotating the on-off knob 235, the battery body 234 can be lifted upwards to make contact with the conductive sheet.

Specifically, the bottom of the second housing 21 is also rotatably connected a color temperature knob 27. The connecting end of the color temperature knob 27 extends into the second housing 21 and is electrically connected to the second circuit board. In this embodiment, with the color temperature knob 27, the brightness, contrast, and color temperature of the color temperature changing LED lamp 24 are manually adjustable, making the video lamp 2 have both wireless remote control and manual adjustment functions.

Specifically, the maximum receiving angle of the second end light sensor 26 is 160°.

Figure 11:
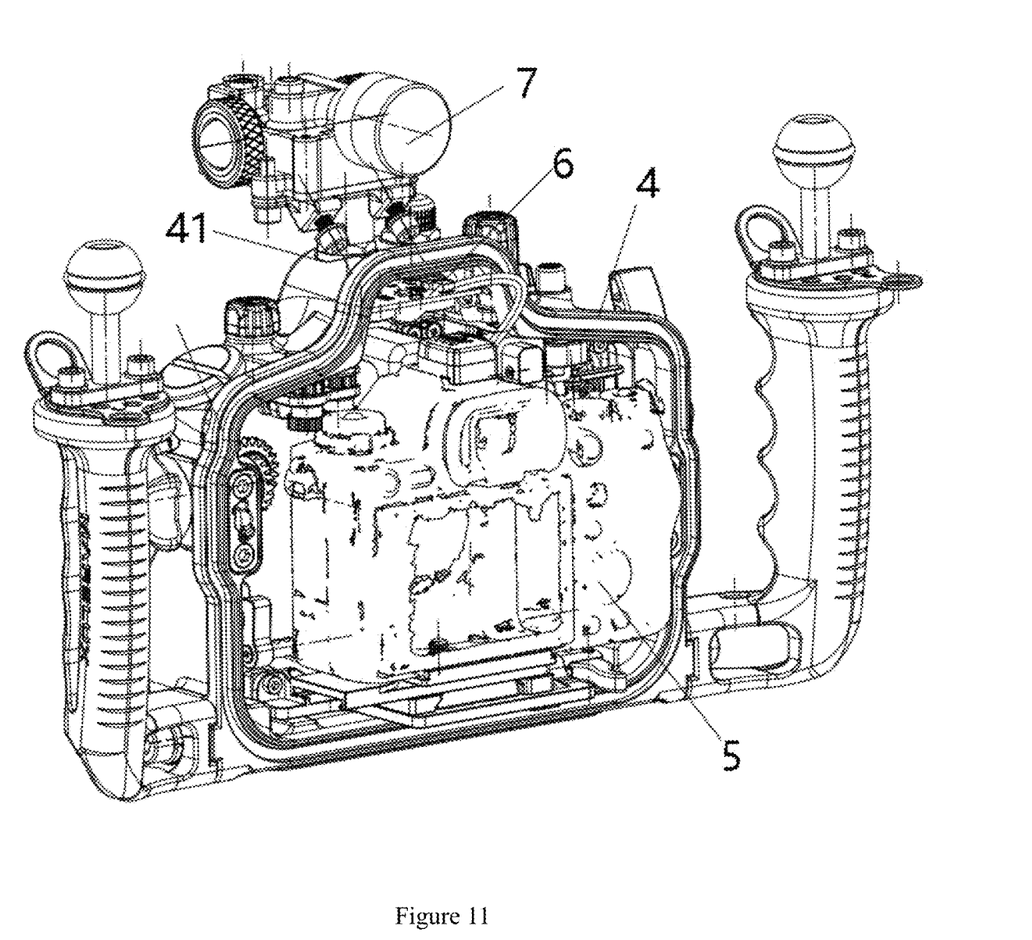
FIG. 11 is a schematic structural diagram of a camera in this embodiment.

This embodiment also discloses a camera, including:
a flash unit;
a waterproof case 4, used for protecting a camera body 5 to avoid water damage, the flash unit being detachably connected to the waterproof case 4, such that the flash unit may be used alone or in combination, improving the applicability of the apparatus;
the camera body 5 installed inside the waterproof case 4, capable of taking photos for an illuminated object;
a flash trigger 6 installed on the inner top wall of the waterproof case 4, capable of generating an optical signal to control the operation of the flash unit, the flash trigger 6 being electrically connected to the hot shoe on the top of the camera body 5,
a repeater 7 being installed on the top of the waterproof case 4 and capable of receiving the optical signal from the flash trigger 6, and then encoding and transmitting a new high-power optical signal, and
the top of the waterproof case 4 being also provided with a waterproof light hole 41, and the flash trigger 6 and the repeater 7 being respectively arranged at both ends of the waterproof light hole 41.

Figure 12:
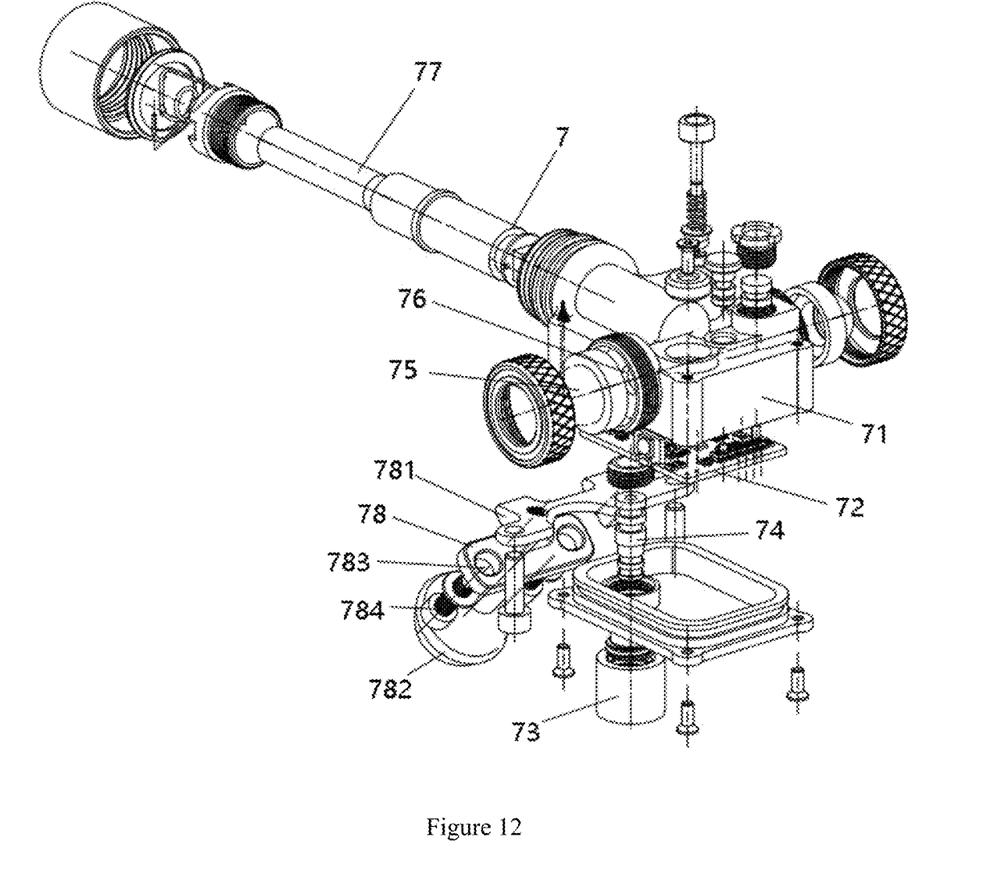
FIG. 12 is an exploded view of a repeater in this embodiment.

Specifically, the repeater 7 includes a third housing 71, a third circuit board 72, a middle section light sensor, a light input locking ring 73, a light input optical fiber 74, a fisheye transmitting window 75, an optical signal transmitter 76 and a second battery 77. The third circuit board 72 is arranged in the third housing 71. The third circuit board 72 is fixedly provided with the middle section light sensor. The bottom of the third housing 71 is fixedly provided with the light input locking ring 73. The light input locking ring 73 is threadedly connected to the waterproof light hole 41. The light input locking ring 73 is of a hollow structure. The light input optical fiber 74 is arranged in the light input locking ring 73. Both sides of the third housing 71 are fixedly provided with the fisheye transmitting window 75. The fisheye transmitting window 75 is provided with the optical signal transmitter 76. The third housing 71 is fixedly provided with the second battery 77. The terminal of the middle section light sensor, the terminal the light input optical fiber 74, the terminal of the optical signal transmitter 76 and the terminal of the second battery 77 are all electrically connected to the third circuit board 72. In this embodiment, the repeater 7 is placed outside the waterproof case 4 of the camera, near the waterproof light hole 41, or directly fixed to the waterproof light hole 41, with a waterproof optical apparatus. In this embodiment, the third housing 71 is preferably of a rectangular structure. The light input locking ring 73 is of a hollow structure, and a threaded line is formed on the side wall of the light input locking ring 73 to fix the third housing 71 to the waterproof case 4. The middle section light sensor is integrated on the third circuit board 72, can recognize a flashing optical signal emitted by the flash trigger 6 and convert it into an electrical signal, and the third circuit board 72 can amplify the electrical signal. The optical signal transmitter 76 can generate an optical signal suitable for propagation underwater and emit it at a large angle around the third housing 71, which is then recognized by the end receiver or end light sensor on a peripheral device to achieve long-distance transmission and wireless remote control underwater. In addition, the fisheye transmitting window 75 is also made of a transparent glass material, which can protect the optical signal transmitter 76 while not affecting the propagation of the optical signal.

In another implementation, for a camera with a built-in flashing lamp, the middle section light sensor can receive the optical signal emitted by the flashing lamp on the camera to control the operation of the flash unit. Therefore, in this situation, the user can choose not to install the flash trigger 6.

Specifically, the third housing 71 is fixedly provided with a fixing member 78. The fixing member 78 includes a ball head fixing sheet 781, a ball head 783 and a fastening bolt 784. The ball head fixing sheet 781 is fixedly arranged on the third housing 71. A fastening threaded hole 782 is formed in the ball head fixing sheet 781, and the ball head 783 is fixedly connected to the ball head fixing sheet 781 through the fastening bolt 784. In this embodiment, with the fixing member 78, it is convenient to fix the repeater 7 to the waterproof case 4. The ball head 783 can be fixed and installed on the waterproof case 4, and the ball head 783 is of a detachable structure that can be removed when not in use, reducing the size of the repeater 7.

Specifically, the third circuit board 72 is fixedly provided with an encoder, and the encoder is electrically connected to the third circuit board 72. In this embodiment, the encoder is integrated on the third circuit board 72, and can quickly encrypt and encode the optical signal emitted by the optical signal transmitter 76. The purpose of encryption is to separate the optical signal from natural light and light emitted by other external devices, so that a terminal receiving device can recognize it.

Specifically, the maximum transmitting angle of the optical signal transmitter 76 is 160°.

This embodiment also discloses a camera flash system, including:
a camera.

The operation principle is as follows:
When the camera is used for photography, a flash signal for triggering external lamp to flash is emitted by the hot shoe on the top of the camera. After the flash trigger 6, which is installed inside the waterproof case 4, received the electric flash signal from hot shoe, the flash trigger 6 will emit a visible light flashing signal, which is then emitted to the exterior of the waterproof case 4 through the waterproof light hole 41. After the repeater 7 placed on the waterproof case 4 receives the signal, the signal is converted into an electrical signal by the middle section light sensor. Then, the electrical signal is amplified by the third circuit board 72. Moreover, the encoder quickly encrypts and encodes the light. The purpose of encryption is to separate the optical signal from natural light and light emitted by other external devices, so that a terminal receiving device can recognize it. After encryption, the optical signal transmitter 76 emits a strengthened encrypted optical signal that is suitable for propagation underwater, and emits it at a large angle towards the periphery of the waterproof case 4 and repeater 7.

When the flash lamp 1 used has the first end light sensor 107 per se, the first end light sensor 107 will transmit the received encrypted optical signal to the first circuit board 103 for fast decoding, and convert it into an electrical signal to drive the flash lamp tube 105 to flash, thereby achieving remote wireless control over the optical signal.

When the flash lamp 1 used does not have a built-in light receiving sensor and processing circuit, the end receiver 3 can be installed outside or near the flash lamp 1, the end receiver 3 is provided with one or more optical signal receiving sensors and decoding circuits. After receiving and decoding the optical signal, the optical signal is converted into a strong optical signal required by ordinary flash lamp for flashing. Through the optical fiber, or direct irradiation of the flash lamp, or optical signal receiving ports on other terminal devices, the flashing of these devices is achieved.

Based on the same principle, the camera can also achieve remote wireless control over the video lamp 2 with the optical signal to make the color temperature changing LED lamp 24 glow to provide necessary illumination for photography, or shut off to avoid interruption of photography.

The present disclosure is described through preferred embodiments, and those skilled in the art know that various changes or equivalent replacements can be made to these features and embodiments without departing from the spirit and scope of the present disclosure. The present disclosure is not limited by the specific embodiments disclosed herein, and other embodiments falling within the scope of the claims of this application are within the scope of protection of the present disclosure.

What is claimed is:

1. A flash system, comprising: at least one of a flash lamp (1) and a video lamp (2);
   wherein the flash lamp (1) is capable of illuminating a photographed object, and the video lamp (2) has functions of color temperature adjustment and full color gamut coverage by light;
   wherein the flash lamp (1) comprises a first housing (101), an end cover (102), a first circuit board (103), a reflection cup (104), a flash lamp tube (105), a first fisheye receiving window (106) and a first end light sensor (107);
   wherein the first circuit board (103) is arranged in the first housing (101), the top of the first housing (101) is fixedly provided with the end cover (102), the top of the end cover (102) is fixedly provided with the reflection cup (104), the flash lamp tube (105) is fixedly installed inside the reflection cup (104), one side of the first housing (101) is fixedly provided with the first fisheye receiving window (106), the first end light sensor (107) is fixedly arranged in the first fisheye receiving window (106), and the terminal of the flash lamp tube (105) and the terminal of the first end light sensor (107) are both threaded into the first housing (101) and electrically connected to the first circuit board (103).

2. The flash system according to claim 1, wherein the first end light sensor (107) is capable of decoding a wireless optical signal into an electrical signal to control the flash lamp tube (105) for photography.

3. The flash system according to claim 1, wherein several flash lamp tubes (105) are arranged, and the flash lamp tubes (105) are arranged in a circular shape.

4. The flash system according to claim 1, wherein the top center of the end cover (102) is fixedly provided with a sighting lamp (108).

5. The flash system according to claim 1, wherein the end cover (102) is also fixedly provided with a flash lamp cover (109), and the inner side of the flash lamp cover (109) is fixedly provided with an arc-shaped glass shade (110).

6. The flash system according to claim 1, wherein the bottom of the first housing (101) is rotatably connected to an adjustment knob (111), one end of the adjustment knob (111) extends into the first housing (101) and is electrically connected to a battery contact (112), and the battery contact (112) is electrically connected to the first circuit board (103).

7. The flash system according to claim 6, wherein the adjustment knob (111) comprises a brightness knob (113) and a function knob (114).

8. The flash system according to claim 1, wherein the maximum receiving angle of the first end light sensor (107) is 160°.

9. The flash system according to claim 1, wherein the flash lamp (1) and the video lamp (2) are both fixedly provided with an end receiver (3), and the end receiver (3) is an external flash trigger capable of receiving an optical signal.

10. The flash system according to claim 1, wherein the video lamp (2) comprises a second housing (21), a bracket (22), a second circuit board, a first battery (23), a color temperature changing LED lamp (24), a second fisheye receiving window (25) and a second end light sensor (26), wherein the bracket (22) and the first battery (23) are fixedly arranged in the second housing (21), the side wall of the second housing (21) is fixedly provided with the second fisheye receiving window (25), the second end light sensor (26) is arranged in the second fisheye receiving window (25), the second end light sensor (26) is threaded into the second housing (21) and is clamped to a groove on the bracket (22), the top of the second housing (21) is fixedly provided with the color temperature changing LED lamp (24), and the terminal of the first battery (23), the terminal of the color temperature changing LED lamp (24) and the terminal of the second end light sensor (26) are all electrically connected to the second circuit board.

11. The flash system according to claim 10, wherein the first battery (23) comprises a battery holder (231), a clamp block (233), a battery body (234) and an on-off knob (235), a clamp slot (232) is formed in one side of the battery holder (231), the clamp block (233) is fixedly arranged on the inner side wall of the second housing (21), the clamp block (233) is clamped to the clamp slot (232), the battery body (234) is arranged in the battery holder (231), the on-off knob (235) is rotatably connected to the bottom of the battery holder (231), and one end of the on-off knob (235) abuts against the battery body (234).

12. The flash system according to claim 10, wherein the bottom of the second housing (21) is rotatably connected to a color temperature knob (27), and the connecting end of the color temperature knob (27) extends into the second housing (21) and is electrically connected to the second circuit board.

13. The flash system according to claim 10, wherein the maximum receiving angle of the second end light sensor (26) is 160°.

14. A camera, comprising:
   the flash system according to claim 1;
   a waterproof case (4), the flash system being detachably connected to the waterproof case (4);
   a camera body (5) installed inside the waterproof case (4), capable of taking photos of an illuminated object; and
   a flash trigger (6) installed on the inner top wall of the waterproof case (4), capable of generating an optical signal to control the operation of the flash system, the flash trigger (6) being electrically connected to a hot shoe on the top of the camera body (5), a repeater (7) being installed on the top of the waterproof case (4) and being capable of receiving the optical signal from the flash trigger (6), and then encoding and transmitting a new high-power optical signal, and the top of the waterproof case (4) being provided with a waterproof light hole (41), and the flash trigger (6) and the repeater (7) being respectively arranged at both ends of the waterproof light hole (41).

15. The camera according to claim 14, wherein the repeater (7) comprises a third housing (71), a third circuit board (72), a middle section light sensor, a light input locking ring (73), a light input optical fiber (74), a fisheye transmitting window (75), an optical signal transmitter (76) and a second battery (77), the third circuit board (72) is arranged in the third housing (71), the third circuit board (72) is fixedly provided with the middle section light sensor, the bottom of the third housing (71) is fixedly provided with the light input locking ring (73), the light input locking ring (73) is threadedly connected to the waterproof light hole (41), the light input locking ring (73) is of a hollow structure, the light input optical fiber (74) is arranged in the light input locking ring (73), both sides of the third housing (71) are fixedly provided with the fisheye transmitting window (75), the optical signal transmitter (76) is arranged in the fisheye transmitting window (75), the third housing (71) is fixedly provided with the second battery (77), and the terminal of the middle section light sensor, the terminal of the light input optical fiber (74), the terminal of the optical signal transmitter (76) and the terminal of the second battery (77) are all electrically connected to the third circuit board (72).

16. The camera according to claim 15, wherein the third housing (71) is fixedly provided with a fixing member (78), the fixing member (78) comprises a ball head fixing sheet (781), a ball head (783) and a fastening bolt (784), the ball head fixing sheet (781) is fixedly arranged on the third housing (71), a fastening threaded hole (782) is formed in the ball head fixing sheet (781), and the ball head (783) is fixedly connected to the ball head fixing sheet (781) through the fastening bolt (784).

17. The camera according to claim 15, wherein the third circuit board (72) is also fixedly provided with an encoder, and the encoder is electrically connected to the third circuit board (72).

18. The camera according to claim 15, wherein the maximum transmitting angle of the optical signal transmitter (76) is 160°.

19. A camera flash system, comprising:

the camera according to claim 14.

20. The flash system according to claim 10, wherein the second end light sensor (26) is capable of decoding a wireless optical signal into an electrical signal to control the LED lamp for video recording.

* * * * *